Figure 1:
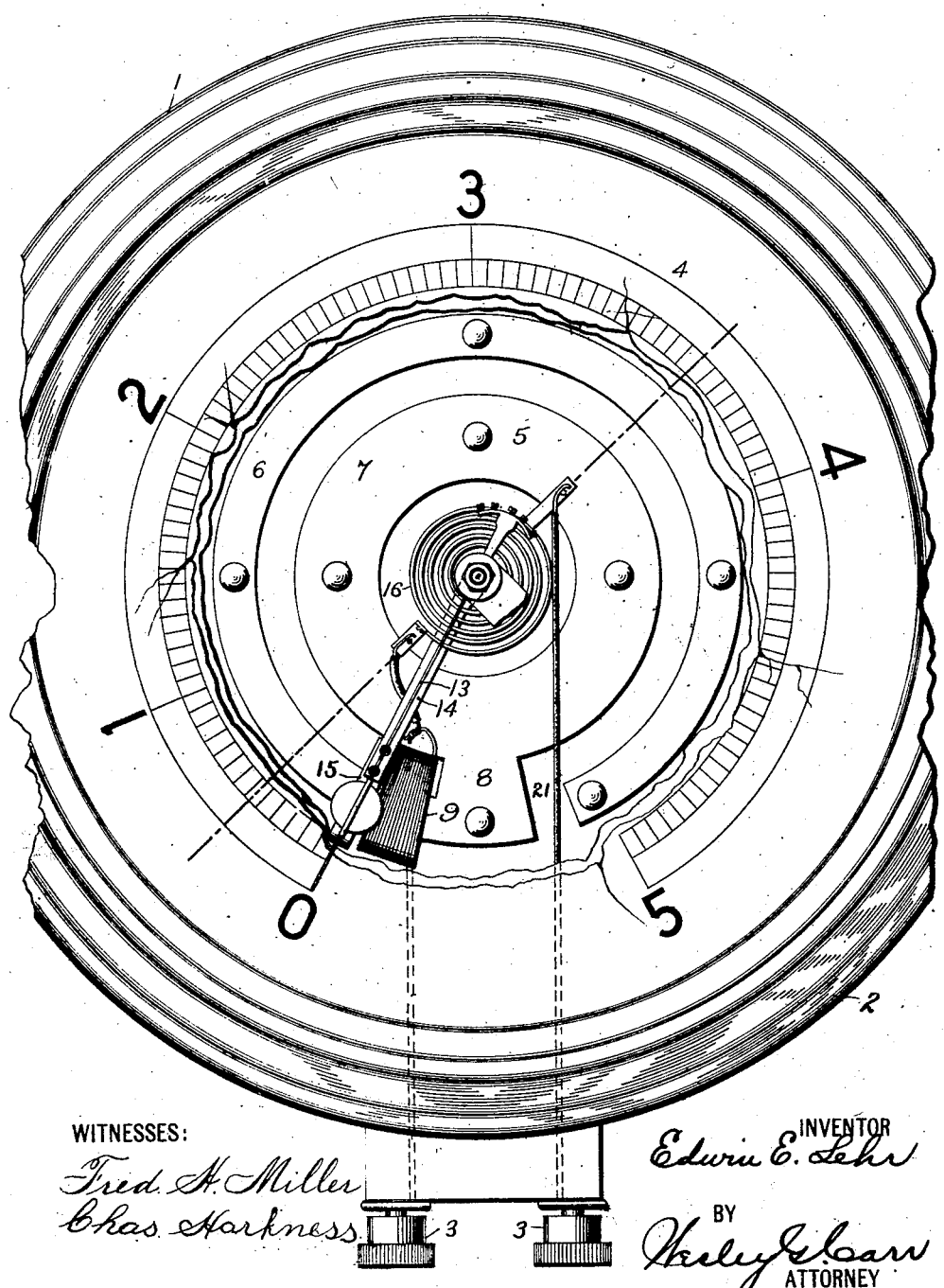

No. 824,696. PATENTED JUNE 26, 1906.
E. E. LEHR.
ALTERNATING CURRENT ELECTRICAL MEASURING INSTRUMENT.
APPLICATION FILED JUNE 24, 1904.

2 SHEETS—SHEET 1.

WITNESSES:
Fred. H. Miller
Chas. Harkness

INVENTOR
Edwin E. Lehr
BY
Keley J. Carr
ATTORNEY

No. 824,696. PATENTED JUNE 26, 1906.
E. E. LEHR.
ALTERNATING CURRENT ELECTRICAL MEASURING INSTRUMENT.
APPLICATION FILED JUNE 24, 1904.

2 SHEETS—SHEET 2.

WITNESSES:
Fred. H. Miller
Chas. Harkness.

INVENTOR
Edwin E. Lehr
BY
Wiley Sloan
ATTORNEY

UNITED STATES PATENT OFFICE.

EDWIN E. LEHR, OF WILKINSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT ELECTRICAL MEASURING INSTRUMENT.

No. 824,696.   Specification of Letters Patent.   Patented June 26, 1906.

Original application filed November 21, 1903, Serial No. 182,166. Divided and this application filed June 24, 1904. Serial No. 214,068.

*To all whom it may concern:*

Be it known that I, EDWIN E. LEHR, a citizen of the United States, and a resident of Wilkinsburg, in the county of Allegheny and State of Pennsylvania, have invented a new and useful Improvement in Alternating-Current Electrical Measuring Instruments, of which the following is a specification, this application being a division of my application, Serial No. 182,166, filed November 21, 1903.

My invention relates to alternating-current electrical measuring instruments, and particularly to instruments of this general class which are employed for indicating the virtual value of the voltage in any given circuit as distinguished from instruments which are employed for registering or recording the integrated current or energy traversing a given circuit during a specific interval of time.

The object of my invention is to provide an instrument of the character indicated which is simple, compact, and inexpensive in construction and accurate in operation and the indicating member of which shall have a large arc of movement over a uniform scale.

A further object of my invention is to provide an instrument which is adapted to accurately indicate the voltage in any alternating-current circuit to which it is properly connected irrespective of wave form and frequency of alternations.

The instrument of my invention comprises, primarily, a magnetic circuit one portion of which is in the form of a magnetizable ring-core that may advisedly be provided with a suitable air-gap to reduce the inductance of the meter. It further comprises two relatively high-resistance magnetizing-coils for the magnetic circuit, one of which is stationary, while the other is rotatably mounted upon an axis coincident with that of the annular core portion which it encircles. The two coils are connected in series, so that the fluxes induced in their common core are opposed, thereby causing the movable coil to be repelled, and if a convenient returning force, such as that of a spiral spring, is applied the angle of separation which occurs when the coils are connected across an alternating-current-supply line will be in proportion to the voltage applied.

Figure 2:
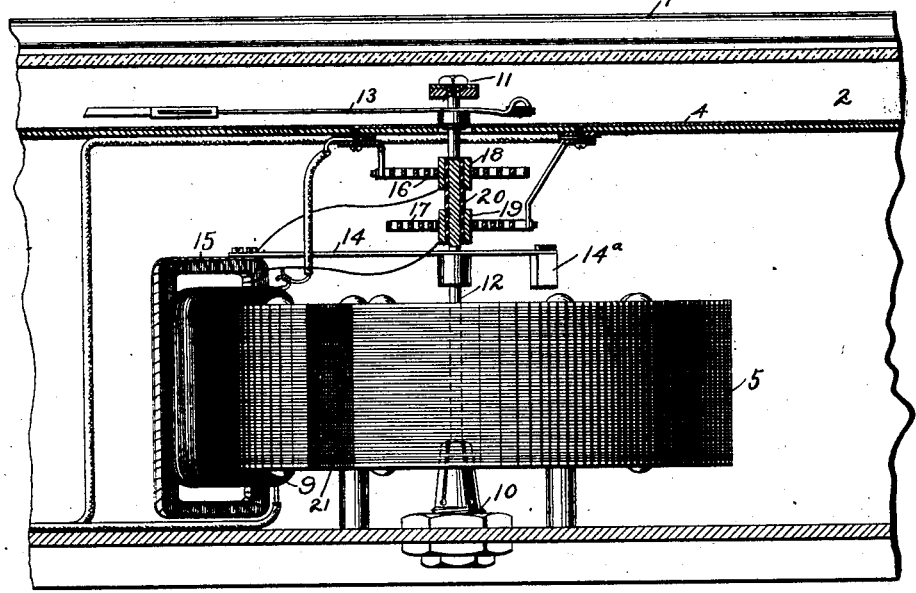
Figure 4:
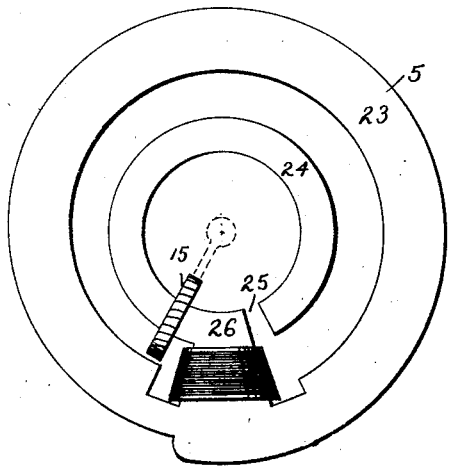
Figure 3:
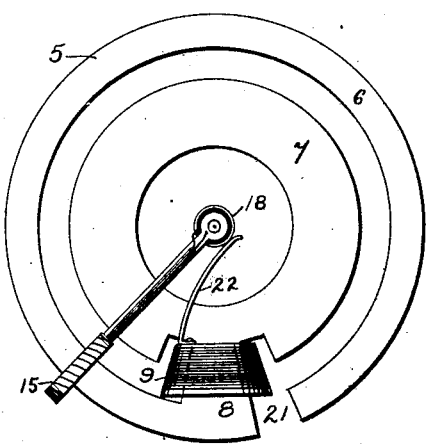

Figure 1 is a face view of an instrument embodying my invention, parts of the casing being broken away. Fig. 2 is a view, partially in elevation and partially in section, of the instrument shown in Fig. 1. Figs. 3 and 4 are diagrammatic views of suitable forms of cores and coils of modified construction.

Referring first to Figs. 1, 2, and 3 of the drawings, the instrument 1 comprises a suitable casing 2, having external binding-posts 3 and a graduated dial-plate 4, all of which may be in substantial accordance with the usual practice. Mounted within the casing upon suitable supports is a laminated iron core 5, comprising two annular and approximately concentric portions 6 and 7, which are connected at one side by a substantially radial portion 8. Upon one of these three portions is mounted a stationary coil 9, comprising a large number of turns of fine wire, the terminals of which are connected across the circuit the voltage of which is to be measured. In Figs. 1 and 2 I have shown the coil 9 as mounted upon the outer portion 6 and adjacent to the portion 8 of the core, and in Fig. 3 I have shown the coil as mounted upon the radial portion 8.

Supported in suitable bearings 10 and 11 at the center of the core 5 is a shaft or spindle 12, upon the outer end of which is mounted a hand or pointer 13 of such length and so located as to coöperate with the graduated scale 4 to properly indicate the voltage of the circuit to which the instrument is connected. The shaft or spindle 12 is also provided with an arm 14, one end of which supports a coil 15 and the other end of which is provided with a suitable counterweight 14ª. As shown in Figs. 1, 2, and 3, the coil 15 loosely surrounds the outer annular portion 6 of the core and is connected in series with the coil 9. As illustrated in Figs. 1 and 2, this series connection is effected by means of and through two spiral springs 16 and 17, the inner ends of which are respectively connected to collars 18 and 19, that are mounted upon the shaft or spindle 12 and are insulated therefrom by means of a sleeve 20. The respective terminals of the coil 15 are connected to the sleeves 18 and 19, and the outer ends of the springs 16 and 17 are respectively connected to one terminal of the coil 9 and to one of the binding-posts 3, the other terminal of the coil 9 being connected to the other binding-post 3.

The springs 16 and 17 serve both as conductors of current and also as means for exerting a constant force in opposition to the electromagnetic force exerted by the core and coils, this double function of the springs being one well known in the art.

In order to reduce the amount of inductance in the meter to satisfactory limits, it may and generally will be found desirable to provide an air-gap in the magnetic circuit, and such air-gap will generally be provided in that portion of the core 6 which is surrounded by the movable coil 15. Such an air-gap 21 is shown in the portion 6 of the core adjacent to the radial portion 8 in Figs. 1, 2, and 3.

Instead of using springs exclusively for making circuit connections between the stationary and the movable coil, as indicated in Figs. 1 and 2, the spring 16 may be omitted and connection between the coils may be effected by means of a brush 22, which makes contact with the collar 18, the other collar 19 and the spring 17 being utilized substantially as indicated in Fig. 2. The magnetizing-coils set up a magnetic flux through the connecting core portion 8 and the ring portion 7 across the long air-gap between the rings 7 and 6 and through the ring 6.

In Fig. 4 I have shown a modified form of core in which the two substantially annular portions 23 and 24 are eccentrically located with reference to each other in order to provide a gap between them which shall be of such varying dimensions from end to end as to permit of the use of a uniformly-divided scale. In this figure I have also shown the movable coil 15 as surrounding the inner portion 24 of the core and have therefore provided a gap 25 therein at a point adjacent to the radial portion 26 on which the stationary coil 9 is mounted.

In order to show that the action of the meter will be such as is hereinbefore set forth, the well-known law to the effect that the repelling force exerted between two coils is proportional to the product of the values of electric current flowing therethrough may be used as a foundation. The action of this law is illustrated in a Siemen's dynamometer in which the repelling force itself is measured; but if coils similarly arranged when no current is flowing are permitted to separate by movably mounting one coil the distance of separation is neither proportional to the repelling force nor to the product of the values of current flowing, by reason of the fact that the strength of the magnetic field into which the movable coil passes is not the same as the strength of the field existing at the position near the fixed coil originally occupied by the movable coil. It is possible, however, to so direct the magnetic field by means of a magnetizable core that its strength is substantially constant throughout the path of the movable coil, in which case the distance of separation is dependent upon a returning-spring or other similar opposing device and may be substantially proportional to the repelling force. This result is effected in Figs. 1 and 3 of the accompanying drawings by providing a long U-shaped magnet having a fixed magnetizing-coil at the curve of the U and the air-gap of which is of constant length. It will of course be understood that the fact that the magnet as illustrated is bent into a circular shape is immaterial. If the two coils are connected in series-circuit relation, the current is the same in both and the repelling force exerted between them is proportional to the square of the current, and therefore is proportional to the square of the voltage applied, and since the distance of separation is proportional to the repelling force, the scale-divisions or a meter so constructed will be of unequal length.

It is usually desirable to have the scale-divisions on an electrical measuring instrument approximately equal, and this result may be effected by making the magnetizable core, which directs the magnetic field, of V shape, as in Fig. 4 of the drawings, instead of U shape, thereby obtaining a variable air-gap which consequently produces a magnetic field which decreases in strength as the air-gap increases in length. If, as hereinbefore explained, the distance of separation between the movable and stationary coils is proportional to the square of the current flowing when the field strength is constant throughout the path of the movable coil, by suitably varying the field strength this distance may obviously be made substantially proportional to the first power of the current, and therefore also proportional to the first power of the voltage applied, and the scale-divisions will then be of substantially equal length.

In Fig. 4 I have shown the movable coil 15 as having no circuit connection with the coil 9, and while circuit connection may be made between these coils in every case where it is found desirable to do so I desire this illustration to be indicative of a construction of instrument in which these coils are not connected, since it may be found feasible and practical to utilize my invention successfully in an instrument for measuring voltage without employing the circuit connections illustrated in the other figures of the drawings.

Since the meter of my invention is provided with an iron core, a relatively small current is required to produce the necessary torque to separate the coils and a relatively large non-inductive resistance may be inserted in series with the coils, so that any variations due to a change in frequency which directly affects the inductive resistance of the circuit are reduced to a minimum. This will be understood from consideration of the relations existing between the resistance, the reaction, and the impedance. If the resistance and reactance are represented by the two short sides of a right triangle, the impedance is represented by the hypotenuse. If the reactance is greater than the resistance or if the two are substantially equal and the reactance is varied, by varying the frequency, the frequency being a factor of the reactance, the impedance will be varied to substantially the same degree. On the other hand, if the resistance is made large relative to the reactance the same variation in the reactance will produce an inappreciable variation in the impedance. Consequently since the current flowing in the coils is equal to the impressed voltage divided by the impedance the current variations and also the variations in the readings on the dial by reason of frequency variations will be reduced to a minimum by inserting a large non-inductive resistance in series with the coils.

It is conceivable that variations in form, dimensions, and relative location of parts other than those indicated in the drawings and hereinbefore referred to may be devised and successfully utilized within the scope of my invention, and I therefore desire it to be understood that all such variations which do not change the mode of operation or result are to be considered as pertaining to the invention.

I claim as my invention—

1. An electrical measuring instrument comprising a magnetizable core having two approximately annular portions in one of which there is an air-gap, one being located within the other and the two being joined by means of a substantially radial portion, a stationary winding on said core and a movable coil surrounding the annular portion which is provided with the air-gap.

2. An electrical measuring instrument comprising a laminated magnetizable core composed of two approximately annular portions, one within the other, and joined by means of a substantially radial portion, a stationary winding on a portion of said core and a movable coil in series with said stationary winding and surrounding one of the annular portions of the core.

3. In an electrical measuring instrument, the combination with a magnetizable core comprising two approximately annular portions one of which has an air-gap, and a third substantially radial portion joining said annular portions, of a movable coil surrounding the core portion having the air-gap.

4. In an electrical measuring instrument, the combination with a magnetizable core comprising two approximately annular, concentric portions one of which has an air-gap, and a substantially radial portion joining said annular portions, of a movable coil surrounding the core portion having the air-gap.

5. In an electrical measuring instrument, the combination with a core comprising two substantially concentric portions one of which has an air-gap, and a substantially radial portion, of a stationary coil mounted upon one of said portions and a movable coil surrounding the core portion having the air-gap and provided with an indicating device.

6. In an electrical measuring instrument, the combination with a core comprising two substantially annular, concentric portions one of which has an air-gap, and an approximately radial portion, of a stationary coil on said radial portion and a movable coil surrounding the core portion that is provided with the air-gap.

7. In an electrical measuring instrument, the combination with a core comprising two substantially annular, concentric portions one of which has an air-gap, and a substantially radial portion, of a stationary coil mounted upon one of said core portions, an indicating-coil surrounding the core portion having the air-gap and means for maintaining a series connection between said coils.

8. In an electrical measuring instrument, the combination with a core comprising two approximately concentric, annular portions, one of which has an air-gap, and a substantially radial portion, of a stationary coil mounted upon one of said core portions, a movable coil surrounding the core portion having the air-gap, means for supporting said coil, means for opposing the movement of said coil and maintaining a series connection between it and the stationary coil, and means for indicating the degree of movement of said movable coil.

In testimony whereof I have hereunto subscribed my name this 6th day of July, 1905.

EDWIN E. LEHR.

Witnesses:
R. W. COPELAND,
BIRNEY HINES.